United States Patent [19]
Lopez Poy et al.

[11] Patent Number: 6,100,328
[45] Date of Patent: Aug. 8, 2000

[54] METHOD FOR THE PRODUCTION OF THERMOPLASTIC AND THERMOADHESIVE REINFORCING MATERIALS USED IN THE CONSTRUCTION OF FOOTWEAR

[75] Inventors: Jorge Alejandro Lopez Poy; Daniel Angel Zoia, both of Buenos Aires, Argentina

[73] Assignee: Fapiquim S.A., San Martin, Argentina

[21] Appl. No.: 08/713,725

[22] Filed: Sep. 13, 1996

[51] Int. Cl.[7] .................................................. C08L 1/00
[52] U.S. Cl. ..................... 524/733; 524/700; 524/732; 524/788; 524/791; 524/589; 524/590; 524/599; 524/612; 264/331.12; 264/331.19
[58] Field of Search ..................... 524/700, 732, 524/733, 788, 791, 589, 590, 599, 612; 264/331.12, 331.19

[56] References Cited

U.S. PATENT DOCUMENTS

| | | | |
|---|---|---|---|
| 3,169,945 | 2/1965 | Hostettler et al. | 260/78.3 |
| 3,669,920 | 6/1972 | Haggis et al. | 260/37 N |
| 4,287,146 | 9/1981 | Midorikawa | 264/128 |
| 4,595,713 | 6/1986 | St. John | 523/105 |
| 4,876,308 | 10/1989 | Melby et al. | 524/780 |
| 5,175,228 | 12/1992 | Wang et al. | 528/48 |

*Primary Examiner*—Judy M. Reddick
*Attorney, Agent, or Firm*—Darby & Darby

[57] ABSTRACT

Disclosed herein is a method for the production of reinforced thermoplastic and thermoadhesive polymers, used to make shaped reinforcing pieces for footwear in general, including sports shoes, these reinforced condensation polymers resulting from the polymerization of monomers such as lactones—specifically epsilon caprolactone, and condensable systems of two components, specifically polyisocyanates, polyols or polyolpolyesters—in the presence of reinforcing materials and, optionally, filling materials. The reinforced thermoplastic and thermoadhesive polymers are obtained in the form of sheets, from which the units or pieces are cut to a specified pattern, for example for the toecap, the heel piece or the inner sole.

15 Claims, No Drawings

METHOD FOR THE PRODUCTION OF THERMOPLASTIC AND THERMOADHESIVE REINFORCING MATERIALS USED IN THE CONSTRUCTION OF FOOTWEAR

BACKGROUND OF THE INVENTION

In conventional practice, polymers—whether resins or addition or condensation polymers—are made according to a sequence and conditions programmed for charging the monomers and introducing catalysts, promoters, initiators and chain extenders, emulsifiers, eliminating volatiles and controlling experimental conditions (temperature, agitation, viscosity and reaction index, etc.).

Polymers are obtained from the polymerizing units in the form of beads, etc. In many cases, the polymerizing units are combined with equipment, in which the formed polymerized materials are processed after the introduction of the corresponding additives and fillers in order to obtain articles shaped by spinning, extrusion, molding etc.

In other cases, the polymerized materials processed, as applicable, by the incorporation of additives—antioxidants, plasticizers, etc.—are stored as raw material for subsequent manufacturing processes, as well as in the form of semi-finished products such as sheets, bars, etc., processed at a later date to form film by blowing, foam-type materials, etc. In these cases, where the finished products require prior formulation of the polymerized material, it is common practice to introduce fillers, additives and reinforcing material that can be selected in terms of the combinations of polymer and the desired effects.

This practice of postponing the filling and/or the reinforcing of the polymerized materials imposes additional costs on the processes used to formulate and manufacture finished polymerized articles, since the introduction of reinforcing materials after the fact requires reprocessing of the fusion-polymerized material (with the optional inclusion of plasticizers).

At the same time, the later inclusion of the reinforcing material requires careful and controlled homogenization of the mixture (polymerized material+reinforcing material) in mixing operations with an energy requirement that is a function of the viscosity of the mixture (which also depends on the temperature, the molecular weight of the polymer and on the polymer/reinforcing material weight ratio). Clearly, the solution to these drawbacks seems evident: raising the temperature, which usually is counterproductive because of the effect of temperature on the depolymerization and decomposition of the polymerized material.

The technology concerning the production of thermoplastic polymers reinforced by conventional means is adequately described in Patent No. 677,296 awarded to Giulini Chemic GmbH on Mar. 4, 1985, included herein by reference. This patent deals with the reinforcing of polymer materials (especially epsilon caprolactone polymers, elastomer polyurethanes, modified polyolefins, etc.).

Certain types of thermoplastic materials are used in the footwear industry to form and retain the structure of the toe and heel of the shoe, in fusion with reinforcing fillers in particles 50 to 500 microns in diameter. Thus, reinforced thermoplastic sheets are obtained, from which pieces are then cut to reinforce the toe and heel of footwear in general.

The principal characteristic of these materials is that they must be sufficiently rigid and at the same time elastic so as to give them the necessary structure and retain the memory of the form, despite distortions produced by wear.

At the same time, it is desirable that, during the manufacturing of the footwear, the material can be shaped, copying the last, and acting like a plastic material above a specified temperature that is called the activation temperature, then becoming elastic again and retaining the memory of the last once it cools. This is called the thermoplastic feature characteristic.

It is desirable for the material to be able to adhere to the reinforcing materials; in some cases, one side is sufficient, but in other cases it is appropriate that it be able to adhere to both the lining and cap side. The most appropriate feature in the manufacture of footwear is for the material to have heat-sensitive adhesive qualities so that, when heated above the activation temperature, the adhesive melts and penetrates the other material superficially and continues to adhere after it has cooled down. These are the characteristics of thermoadhesion.

In some cases, it is appropriate for the adhesive, as it melts, to liquefy more on one face than on the other. This is the case, for example when a dressed leather is to be glued to one face and a very fine fabric to the other. In some low-cost shoe designs, the toecap material does not need adhesive on both sides, because no linings are put in since they are not visible. In the case of low-cost, unlined, shoes, where the heel reinforcement material is visible, materials can be used that include the lining material in the reinforcement, laminated on the face that is visible so as to eliminate the lining in the construction of the shoe.

The best-known materials are produced by impregnating a fabric or non-woven fleece with an emulsion of thermoplastic polymer, usually carboxylated butadiene styrene. This polymer softens and becomes plastic at a temperature of 70° to 90° C., but does not liquefy; for adhesion, it is necessary to laminate on a light coating of heat-sensitive adhesive. The material most commonly used as a heat-sensitive adhesive is a blend of a polyethylene vinyl acetate copolymer with resins and other additives. Also used as adhesives are cyclic ester polymers or copolymers and blends of these known polymers with polycaprolactone, in accordance with U.S. Pat. No. 3,778,251 and Canadian Patent 1,027,838. The advantage of using this polymer is that it not only serves as an adhesive, but also helps provide elastic rigidity to the reinforcing material, since the polycaprolactone has the particular property of melting at a temperature below 60° C., and once cooled, of crystallizing below 50° C., to give excellent elastic rigidity to the material.

Another material widely used to reinforce toecaps is a polyamide copoylmer (for example, U.S. Pat. No. 4,122,229), which is applied in molten form; in this case, the adhesive itself is also the reinforcing material.

Another material used consists of a blend of ground plastic particles and polycaprolactone in accordance with the German patent cited. In this case, the ground plastic is used as a filler and polycaprolactone as the agglutinant. The agglutinant of the reinforcing material sometimes also serves as an adhesive.

Other materials used are ionomer sheet extrusions; these polymers have the particular property of melting at low temperatures of 80°–90° C.; once cooled, they have excellent elastic rigidity and a high viscosity, which therefore prevents direct adhesion and makes the lamination of heat-sensitive layers of adhesive necessary.

In addition, multilaminated materials made of combinations of the above-mentioned woven and non-woven materials, impregnated or not, and sheets of polymers extruded in fine layers are also used.

In all cases, then, thermoplastic polymers are used for the production of thermoplastic reinforcing materials. In both the patented cases and the not patented cases, the thermoplastic polymers are used in the polymerized state. This means that, for processing them, they have to be transformed physically by supplying energy to melt them.

The molten polymers have a viscosity that increases with the molecular weight and decreases as the temperature increases. For the processing, it is desirable for the viscosity to be low, so that polymers can be worked with greater ease; in the case of compound materials, the low viscosity makes it possible to wet the fibers or particles of filler. It is also known that the binding power and strength of polymers is proportional to their molecular weight, the polymers with the greatest binding power being the most appropriate for reinforcing materials. The solution is to raise the processing temperature which degrades the polymers and entails an expenditure of energy, since the polymers have to be cooled again after the processing.

At the same time, the polymers utilized have molecular weights and softening temperatures determined by their manufacturers and, while there are different grades, it is not possible to regulate them to meet the optimum requirements of each application.

These aspects of the technology relating to the production and conventional application of polymers and their effect on the practices and costs of the footwear industry, particularly as regards the manufacture of the reinforced polymer components used in modern footwear (heel pieces, etc.) have been examined and reviewed by the Applicant. This technology is adequately discussed and illustrated in German patent 677,296 awarded to Giulini Chemic GmbH, already referred to earlier.

BRIEF DESCRIPTION OF THE INVENTION

This invention relates to a method for the manufacture of reinforced thermoplastic and thermoadhesive polymers used to form reinforcing pieces for footwear, and includes:

keeping monomers selected from epsilon caprolactone and precursor blends of polyurethane, which include polyisocyanates and polyols or polyolpolyesters in the presence of reinforcing materials and, optionally, of filling materials, under polymerization conditions and then shaping the polymer material formed by lamination, said reinforcing material comprising filaments, fibrous particles or microgranules.

Another object of the invention is a method for the production of reinforced thermoplastic and thermoadhesive polymers that can be used to form reinforcing pieces for footwear, which includes:

keeping monomers selected from among epsilon caprolactone and precursor blends of polyurethane, which include polyisocyanates and polyols or polyolpolyesters in the presence of reinforcing materials and, optionally, of filling materials, under polymerization conditions and then shaping the polymer material formed by lamination, said reinforcing material comprising filaments, fibrous particles or microgranules while the lined reinforcing material includes woven filaments of between 5 and 30 dtex.

Another inventive method is a process for the manufacture of reinforced thermoplastic and thermoadhesive polymers that can be used to form reinforcing components for footwear, which includes keeping monomers selected from among epsilon caprolactone and precursor blends of polyurethane, which include polyisocyanates and polyols or polyolpolyesters in the presence of reinforcing materials, and, optionally, of filling materials, under polymerization conditions and then shaping the polymer material formed by lamination, said reinforcing material comprising filaments, fibrous particles or microgranules where the filling material is calcium carbonate or powdered sodium silicate or ground wood.

DETAILED DESCRIPTION OF THE INVENTION

The object of the invention is to obtain a compound reinforcing material, produced by the direct polymerization of monomers in contact with the filling and reinforcing materials. The advantage is that it is possible to work with various fibrous and powdered filling materials, since the monomers, because of their low viscosity, can efficiently wet all types of fillers and fibers. At the same time, manufacturing costs are lowered because the number of processing steps is reduced by one, with the result that energy consumption is reduced. In addition, certain parameters can be controlled, such as the final molecular weight and the polymer softening temperature, to meet the precise needs of the user.

For the purposes of this invention, it is possible to use as monomers polyols, diols, caprolactone monomer, diisocyanates which, upon reacting chemically, form polyurethanes, or a caprolactone monomer which, upon reacting, is polymerized into polycaprolactone. Suitable diisocyanates include, but are not limited to, methylene diisocyanate, hexamethylene diisocyanate, 2,4-toluene diisocyanate, and diphenylmethane diisocyanate. Suitable polyols include, but are not limited to, condensation products of sebacic acid, azelaic acid, or adipic acid esterified with hexylene glycol, butylene glycol, or ethylene glycol.

The techniques for the mass polymerization of polyurethane are well known, as are the techniques for mass polymerization of caprolactones (for example, U.S. Pat. No. 3,169,945).

In this invention, polymerization is carried out using conventional techniques, but in the presence of the structural filling materials, namely fillers, fibers or fabric. In this way, the final product is obtained directly in its final physical form and is then cooled after polymerization in a continuous cooler, forming a sheet of the desired thickness.

The presence of fillers does not affect the quality of polymerization, because they are inert. The moisture, which the filling materials might introduce, could affect the polymerization. However, the moisture is eliminated by heating and vacuum. The presence of fillers does not entail a greater expenditure of thermal energy for the polymerization; the small increase in mechanical energy, necessary for homogenization, is negligible since fillers are introduced at the outset, when the viscosity is low; in the final phase, the viscosity is the highest and the presence of fillers has little impact.

This invention then proposes another possible alternative, which has been tested experimentally to produce reinforced, thermoplastic and thermoadhesive materials and consists of the introduction of fillers—in powdered, granulated or filament form—during the process of forming the thermoplastic polymer, so that once polymerization is completed, reinforced polymers are obtained, shaped into sheets, plates, etc., or molded into units of pre-established form and size. Specifically involved are epsilon caprolactone polymers and polyurethanes.

This operational alternative, which constitutes the object of this invention, is advantageous in that the filling and reinforcing materials are moistened and penetrated by the monomers, the prepolymers formed with the remaining components of the medium, so that polymerization also takes place within the particles or filaments of the filling and/or reinforcing materials and the linkage or bonding between the polymerized matrix and the filling and/or reinforcing materials is increased.

At the same time, this alternative is advantageous from another standpoint, in that reinforced thermoplastic and thermoadhesive materials are obtained in a single operation, in contrast to conventional techniques, in which the introduction of those components occurs in a subsequent operation after the polymerization is completed.

In the preceding text, the term "filler" refers to materials incorporated into decorative and/or bulking polymers, whereas the "reinforcing materials" are those, which are introduced for the purpose of improving certain properties, such as hardness, tensile strength, flexibility, etc., although such incorporation obviously can produce desirable aesthetic effects.

The products of the inventive method are molded into sheets 0.1 to 3 mm thick or into units dimensioned for each type of shoe.

The following examples, given by way of illustration, present the best means of putting this invention into practice:

EXAMPLE

1. Continuous polymerization of polyurethane with fillers and short fibers.

The following components are mixed in a closed container with a mixer and heat: polyol (product of the esterification of 100 parts of sebacic acid with 1,6-dihydroxyhexane, hydroxyl number 57.2, acidity index 2.54). 100 parts of filler (10 parts of short cotton fibers, 40 parts of ground wood, 50 parts of micronized calcium carbonate). After the temperature is raised to 80° C., a 40 torr vacuum is maintained for 60 minutes. A catalyst (triethylenediamine, 0.2 parts), is added. This mixture is called component "A".

Into a continuous, closed kneader unit with self-cleaning kneading shafts and a heating/cooling system, the following components are fed in the following proportions using high-precision positive-displacement dosing pumps: 100 parts of component "A" and 12.5 parts of MDI diphenylmethane diisocyanate.

The temperature is raised to 105° C. for 5 minutes and is then lowered to 85° C. at the outlet. Discharge is through a flat die into a cooler, formed by two stainless steel belts coated with a non-stick "fluoropolymer" material. The steel belts roll the material. Lamination thickness can be regulated in the admission cylinders. The steel belts are externally cooled by cold water, the material is crystallized between the belts and demolded in continuous form and then coiled.

Using conventional industrial techniques for the manufacturing of footwear, cuts are made in the sheet, which is then reactivated at 70° C. and inserted between the lining material and the toecap of the shoes, after which a slight pressure is applied. The assembly is then placed immediately into the last. After that, it is passed into an oven at 80° C. Once the shoe is finished and at ambient temperature, the proper adhesion and elastic rigidity of the reinforcing material are tested.

2. Continuous polymerization of polyurethane over textile material.

A polyol (100 parts, product of the esterification of sebacic acid and 1,6-dihydroxyhexane, hydroxyl number 57.2, acidity index 2.54) is loaded into a closed container with a mixer and heater. After the temperature is raised to 80° C., a 40 torr vacuum is maintained for 60 minutes. MDI diphenylmethane diisocyanate (32.5 parts) is added and allowed to react at 80° C. for 90 min. This prepolymer is known as component "A".

The same polyol (100 parts, product of the esterification of sebacic acid and 1,6-dihydroxyhexane, hydroxyl number 57.2, acidity index 2.54) is loaded into another closed container with mixer and heater. In addition, 50 parts of micronized calcium carbonate are introduced as filler. After the temperature is raised to 80° C., a 40 torr vacuum is maintained for 60 minutes, whereupon 0.3 parts of a catalyst (triethylenetriamine) are added. This mixture is called component "B".

Using high precision positive-displacement dosing pumps, components "A" and "B" are fed in the proportions of 40 parts of "A" to 100 parts of "B" into a high speed mixing die, which discharges the mixture onto a needle-punched non-woven polyester fiber of 200 g/m$^2$. The material then immediately enters a unit consisting of two stainless steel belts coated with a non-stick "fluoropolymer" material. The steel bands roll the material. The thickness of lamination can be regulated on the admission cylinders. The first section of the steel belts is heated externally by infrared rays to a temperature of 100° C. to accelerate the polymerization reaction. Continuing into the second section, the belts are externally cooled by cold water and the material crystallized between the belts and demolded in continuous form at the outlet and coiled.

Using conventional industrial techniques for manufacturing footwear, cuts are made in the sheet, which is then reactivated at 75° C. and inserted between the lining material and the toecap of the shoes, after which a slight pressure is applied. The assembly is then placed immediately into the last. After that, it is passed into an oven at 85° C. Once the shoe is finished and at ambient temperature, the proper adhesion and elastic rigidity of the reinforcing material are tested.

3. Batch polymerization of polyurethane with fillers and short fibers.

The following components are mixed in a closed container equipped with kneading arms having the capacity to handle highly viscous products and with a heating/cooling system: 100 parts of polyol (product of the esterification of sebacic acid and 1,6-dihydroxyhexane, hydroxyl number 57.2, acidity index 2.54), 100 parts of filler (10 parts of short polyamide fibers of 6.6 nylon, 2–3 mm long. Titer 15 dtex, 90 parts of ground PET polyester with a particle size of 500 microns). After the temperature is raised to 80° C., a 40 torr vacuum is maintained for 60 minutes. After 12.5 parts diphenylmethane diisocyanate are added, the mixture is maintained at 95° C. for 60 minutes and then at 85° C. It is discharged by means of a screw pump and a flat die into a cooler formed of two stainless steel belts coated with a non-stick "fluoropolymer" material. The steel belts roll the material. The lamination thickness can be regulated in the admission cylinders. The steel belts are externally cooled by cold water, the material is crystallized between the belts and demolded in continuous form at the outlet and then coiled.

Using conventional industrial techniques for the manufacturing of footwear, cuts are made in the sheet, which is then reactivated to 70° C. and inserted between the lining material and the toecap of the shoes, after which a slight pressure is applied. The assembly is then placed immediately into the last. After that, it is passed into an oven at 80° C. Once the shoe is finished and at ambient temperature, the proper adhesion and elastic rigidity of the reinforcing material are tested.

4. Batch polymerization of polycaprolactone with fillers and short fibers.

The following components are mixed in a closed container equipped with kneading arms having the ability to handle highly viscous products and with a heating/cooling system: 110 parts of an epsilon caprolactone monomer, 100 parts of filler (10 parts micronized calcium carbonate, 90 parts ground wood particle size 500 micros). After the temperature is raised to 80° C., a 40 torr vacuum is maintained for 60 minutes, 2 parts 1-6-dihydroxyhexane and 0.4 parts tetraisopropyl titanate as a catalyst are added. The temperature is then raised to 165° C. for 180 minutes and lowered to 85° C. The product is discharged by means of a screw pump and a flat die into a cooler, formed by two stainless steel belts coated with a non-stick "fluoropolymer" material. The steel belts roll the material; the rolling thickness in the cylinder can be regulated externally by cold water. The material is crystallized between the belts and demolded in continuous form at the outlet from the cooler, then coiled.

Using conventional industrial techniques for manufacturing footwear, cuts are made in the sheet, which is then reactivated at 65° C. and inserted between the lining material and the toecap of the shoes, after which a slight pressure is applied. The assembly is then placed immediately into the last. After that, it is passed into an oven at 75° C. Once the shoe is finished and at ambient temperature, the proper adhesion and elastic rigidity of the reinforcing material are tested.

Bibliography

U.S. Pat. No. 3,169,945 (Mass polymerization of polyurethanes).
U.S. Pat. No. 4,122,229 (Polyamides as a reinforcing material for footwear).
U.S. Pat. No. 3,778,251 (Caprolactone polymers as
Canadian Patent No. 1,027,838 reinforcing materials for footwear)
Spanish Patent No. 677,296 (Reinforced polymerized materials) op. cit.

What is claimed is:

1. A method of producing reinforced thermoplastic and thermoadhesive polymers which can be used for footwear pieces comprising the steps of:

forming a first mixture comprising (A) a reinforcing material and
(B) (i) a lactone monomer,
(ii) a mixture of a polyisocyanate and a polyol, or
(iii) a mixture of a polyisocyanate and a polyolpolyester;

polymerizing the first mixture simultaneously with said forming step under polymerization conditions; and shaping the polymerized mixture while being heated.

2. The method according to claim 1 wherein said reinforcing material comprises at least one of woven, felted or loose filaments.

3. The method according to claim 2, in which said reinforcing material includes filaments of 1 to 30 dtex.

4. The method according to claim 1 wherein said reinforcing material comprises at least one of fibrillar particles from 1 to 300 microns in diameter and up to 3 mm long or microgranules between 10 and 600 microns in diameter.

5. The method according to claim 1 wherein said polyisocyanate is selected from the group consisting of methylene diisocyanate, hexamethylene diisocyanate, diphenylmethane diisocyanate, and 2,4-toluene diisocyanate.

6. The method according to claim 1 wherein said polyol is a condensation product of sebacic, azelaic or adipic acid esterified with at least one of hexylene glycol, butylene glycol or ethylene glycol.

7. The method according to claim 6, in which the condensation product is a dimer.

8. The method according to claim 1 wherein the step of forming the mixture further includes adding a filler material.

9. The method according to claim 8 wherein said filler comprises at least one of ground wood, non-thermoplastic particles or thermoplastic particles.

10. The method according to claim 8, wherein said filler comprises at least one of powdered calcium carbonate or sodium silicate.

11. The method according to claim 1 wherein said lactone comprises an epsilon caprolactone.

12. The method according to claim 1 further comprising the step of cooling the heated shaped piece into solid pieces.

13. The method according to claim 1 wherein the shaping is carried out by rolling.

14. The method according to claim 1, wherein said lactone monomer comprises a caprolactone monomer.

15. The method according to claim 1, wherein said polyisocyanate comprises a diisocyanate.

* * * * *